(12) United States Patent
Nothof et al.

(10) Patent No.: US 8,496,270 B2
(45) Date of Patent: Jul. 30, 2013

(54) TRANSFORMER OIL HOLDING ASSEMBLY

(75) Inventors: Eugen D. Nothof, St. Marys (CA); Eugen R. Nothof, Stratford (CA)

(73) Assignee: CMV Corporation, Brunner, ON (CA)

( * ) Notice: Subject to any disclaimer, the term of this patent is extended or adjusted under 35 U.S.C. 154(b) by 553 days.

(21) Appl. No.: 12/718,581

(22) Filed: Mar. 5, 2010

(65) Prior Publication Data
US 2010/0224640 A1 Sep. 9, 2010

Related U.S. Application Data

(60) Provisional application No. 61/157,657, filed on Mar. 5, 2009.

(51) Int. Cl.
*B60P 3/22* (2006.01)

(52) U.S. Cl.
USPC .......... 280/839; 280/837; 280/838; 220/562; 220/564

(58) Field of Classification Search
USPC ............................ 280/837–839; 220/562, 564
See application file for complete search history.

(56) References Cited

U.S. PATENT DOCUMENTS

| | | | | | |
|---|---|---|---|---|---|
| 2,158,359 | A | * | 5/1939 | Finnlgan | 239/75 |
| 3,228,466 | A | * | 1/1966 | Carleton | 165/169 |
| 3,280,301 | A | | 10/1966 | Anderson et al. | |
| 3,341,128 | A | * | 9/1967 | Leon et al. | 239/131 |
| 3,595,307 | A | * | 7/1971 | Mowatt-Larssen et al. | 165/47 |
| 3,685,458 | A | * | 8/1972 | Price et al. | 105/358 |
| 4,131,214 | A | | 12/1978 | Rogers | |
| 4,346,905 | A | | 8/1982 | Smetanick | |
| 4,476,788 | A | * | 10/1984 | Loevinger | 105/451 |
| 4,624,189 | A | * | 11/1986 | Loevinger | 105/451 |
| 5,058,511 | A | * | 10/1991 | Loevinger | 105/451 |
| 5,213,367 | A | | 5/1993 | Norman, Jr. et al. | |
| 5,653,469 | A | | 8/1997 | Wade | |
| 5,957,500 | A | | 9/1999 | Wade | |
| 5,979,420 | A | * | 11/1999 | Kawamura | 123/557 |
| 6,152,492 | A | | 11/2000 | Markham et al. | |
| 6,199,910 | B1 | | 3/2001 | Wade | |
| 6,279,955 | B1 | | 8/2001 | Fisher | |
| 6,375,222 | B1 | | 4/2002 | Wade | |
| 7,650,878 | B2 | * | 1/2010 | Kleinberger | 123/557 |
| 7,963,272 | B2 | * | 6/2011 | Kleinberger | 123/557 |
| 2007/0056569 | A1 | * | 3/2007 | Kleinberger | 123/547 |
| 2010/0013207 | A1 | | 1/2010 | Markham | |

* cited by examiner

*Primary Examiner* — Kevin Hurley
*Assistant Examiner* — Michael Stabley

(57) ABSTRACT

A transformer oil holding assembly for holding transformer oil. The transformer oil holding assembly includes a tank subassembly with one or more tanks for containing the transformer oil, the tank subassembly having a lower exterior surface adapted for engagement with a ground surface, and one or more sets of wheels for at least partially supporting the tank subassembly, each set of wheels being movable between a lowered position and a raised position, a suspension subassembly mounted to the tank subassembly, and one or more stop subassemblies for at least partially maintaining the set of wheels in the lowered position. Each stop subassembly includes a stop lever movable between an engageable condition, in which a stop element is engageable with the suspension subassembly to maintain the set of wheels in the lowered position, and a disengaged condition, in which the stop element is disengaged from the suspension subassembly.

15 Claims, 15 Drawing Sheets

TRANSFORMER OIL HOLDING ASSEMBLY

This application claims the benefit of U.S. Provisional Patent Application No. 61/157,657, filed Mar. 5, 2009, and incorporates such provisional application in its entirety by reference.

FIELD OF THE INVENTION

The present invention is a transformer oil holding assembly for holding transformer oil.

BACKGROUND OF THE INVENTION

Transformer oil (also known as insulating oil) is used in oil-filled transformers. From time to time, in order to permit maintenance of the transformer, the transformer oil is removed from the transformer. Recently, to reduce costs, attempts have been made to re-use transformer oil which has been removed from a transformer.

In order for the transformer oil to function properly, the transformer oil must not be mixed with water. The temperature of the transformer oil also must be maintained within a certain range, e.g., between about 100 C and about 110 C. For the transformer oil to be usable after it has been removed from the transformer, therefore, the transformer oil must be heated while it is out of the transformer, i.e., maintained within the temperature range described above. Also, care must be taken to avoid mixing the transformer oil with water. For instance, because such mixing may take place due to water vapor in the air becoming mixed in the transformer oil, it is difficult to avoid inadvertently mixing water into the transformer oil while the transformer oil is moved into, or out of, the transformer. Accordingly, specialized equipment is needed for temporary storage of the transformer oil.

In addition, the volume of transformer oil involved, e.g., for a single transformer, is relatively large. For instance, a single transformer may have between about 90,000 and about 360,000 liters of transformer oil in it.

In the prior art, the attempts to maintain the removed transformer oil within the required temperature range have typically involved attempting to heat a large tank in which the transformer oil is temporarily deposited, for example, using electric heating elements positioned in tank walls. However, the prior art tanks in which heating has been done in this way have not worked well. It has been found that the prior art heating elements in or on the walls of the prior art tanks have provided only localized heating of the transformer oil. The prior art heating elements are not capable of heating the entire volume of transformer oil in the prior art tank with an acceptable degree of uniformity.

Yet another problem with the prior art units is that they generally are constructed to accommodate relatively small volumes of transformer oil, and accordingly a number of the prior art units may be required for temporary storage of the transformer oil from a single large transformer, e.g., so that maintenance work can be done on such large transformer. A road-ready trailer (i.e., in which the load is partially supported by the wheels of the prior art unit) could not hold the volume of transformer oil typically held in a large transformer.

SUMMARY OF THE INVENTION

There is therefore a need for a transformer oil holding assembly for holding transformer oil on a temporary basis which addresses or mitigates one or more of the disadvantages of the prior art.

In its broad aspect, the invention provides a transformer oil holding assembly for holding transformer oil, the transformer oil holding assembly including one or more tank subassemblies with one or more tanks for containing the transformer oil, the tank subassembly having a lower exterior surface adapted for engagement with a ground surface, and one or more sets of wheels for at least partially supporting the tank subassembly. Each set of wheels is movable between a lowered position, in which the tank subassembly is at least partially supported by the set(s) of wheels, and a raised position, in which the lower exterior surface of the tank subassembly is at least partially engaged with the ground surface. The transformer oil holding assembly also includes a suspension subassembly mounted to the tank subassembly. Each set of wheels is mounted on the suspension subassembly, and the suspension subassembly is adapted to move each set of wheels between the lowered position and the raised position, and to locate each set of wheels in the lowered and the raised positions respectively. In addition, the transformer oil holding assembly also includes one or more stop subassemblies for at least partially maintaining each set of wheels in the lowered position. Each stop subassembly includes a stop lever having an elongate lever body extending between a proximal end and a distal end, and a stop element positioned at the distal end of the lever body. The stop lever is pivotable about a pivot axis located at the proximal end of the lever body. The stop lever is movable between an engageable condition, in which the stop element is engageable with the suspension subassembly to maintain the set of wheels in the lowered position, and a disengaged condition, in which the stop element is disengaged from the suspension subassembly.

In another aspect, each tank is at least partially defined by a wall between each tank and an adjacent one of the tanks, each tank being at least partially defined by a floor portion thereof, each wall extending to a predetermined height above the floor portion selected to permit fluid communication between each tank and the adjacent one of the tanks over the wall.

In another of its aspects, the invention provides a piping subassembly including one or more heaters for heating the transformer oil to one or more preselected temperatures as the transformer oil passes through the heater(s).

In another of its aspects, the invention provides a transformer oil holding assembly for holding transformer oil, the transformer oil holding assembly including one or more tank subassemblies having a number of tanks for containing the transformer oil and a piping subassembly through which the transformer oil is movable into and out of the tanks. The piping subassembly includes one or more heaters for heating the transformer oil to one or more preselected temperatures as the transformer oil passes through the heater(s).

In yet another aspect, the transformer oil holding assembly additionally includes a number of nozzles, one or more of the nozzles being positioned in each tank respectively, for directing the transformer oil into each tank respectively at a predetermined distance above a floor portion at least partially defining the tank.

BRIEF DESCRIPTION OF THE DRAWINGS

The invention will be better understood with reference to the drawings, in which.

DETAILED DESCRIPTION

Figure 4A:
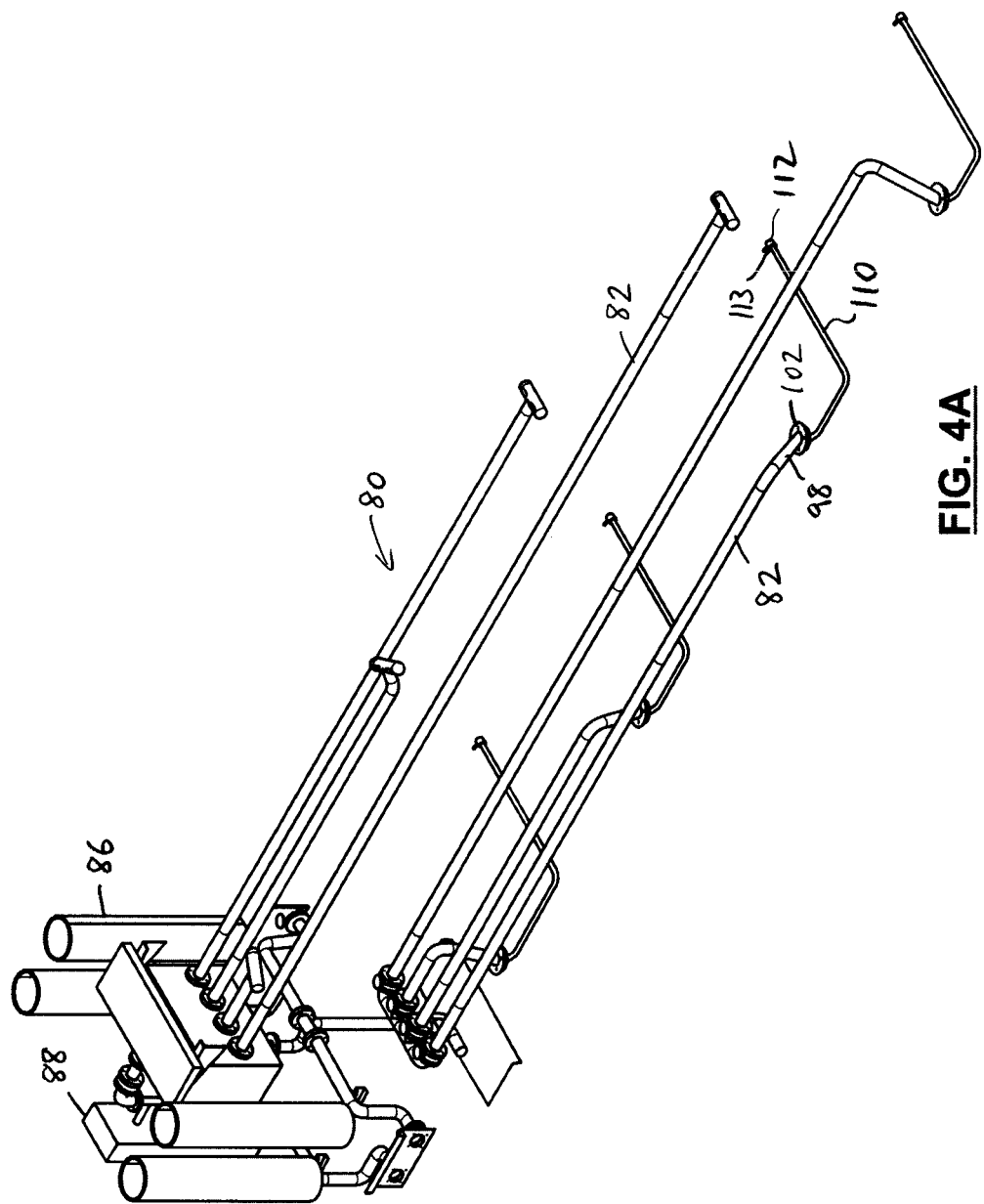
FIG. 4A is an isometric view of an embodiment of a portion of a piping subassembly of the invention, drawn at a larger scale.
Figure 5A:
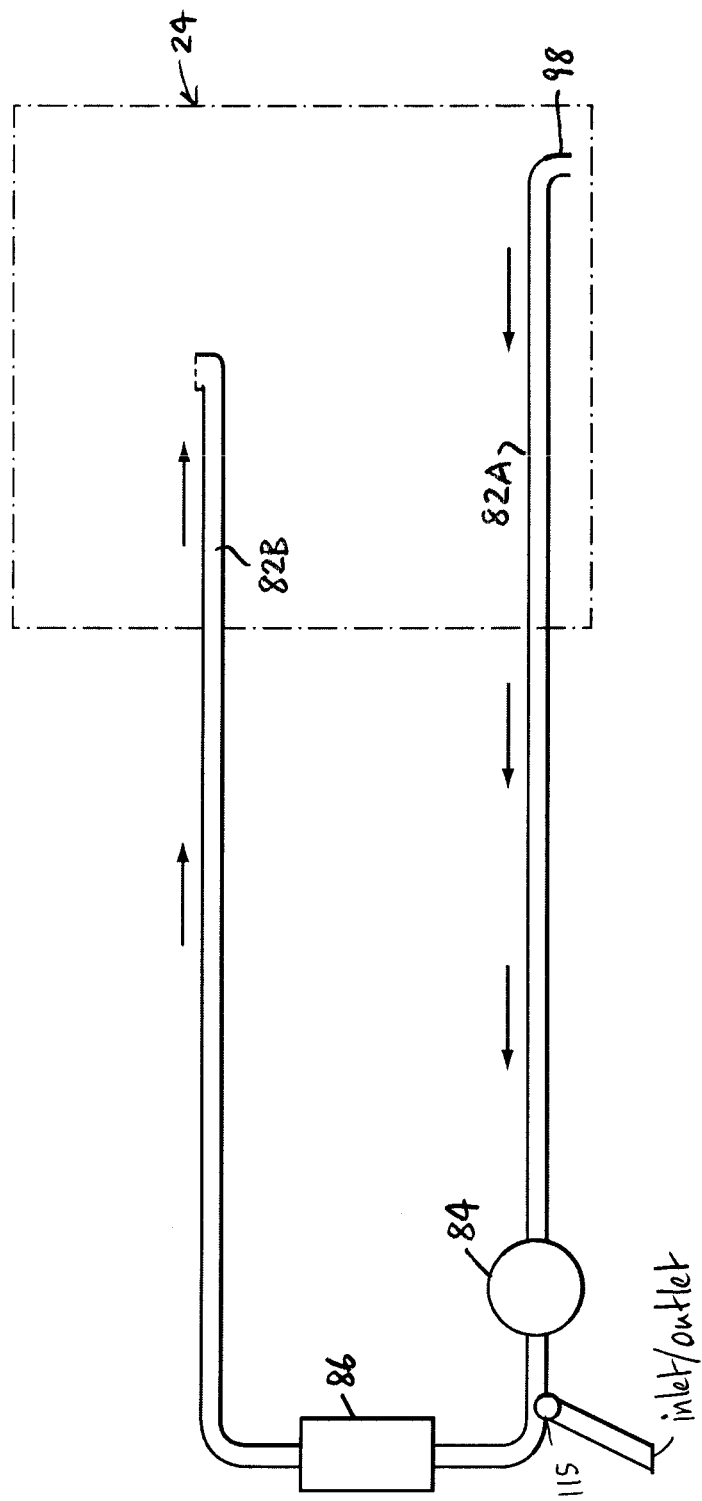
FIG. 5A is a schematic illustration of an embodiment of the piping subassembly of the invention.
Figure 5B:
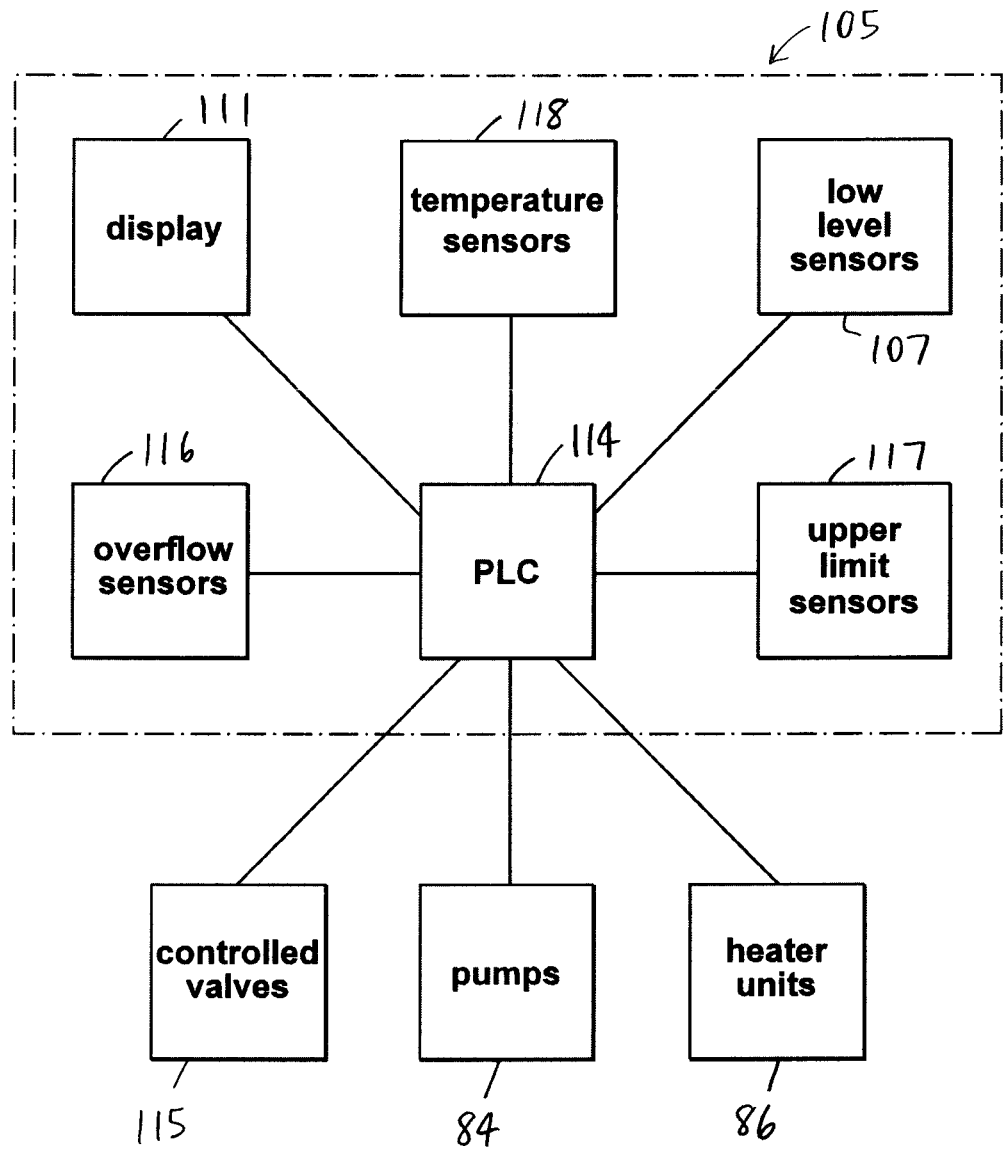
FIG. 5B is a schematic of a portion of an embodiment of the piping subassembly of the invention.
Figure 6A:
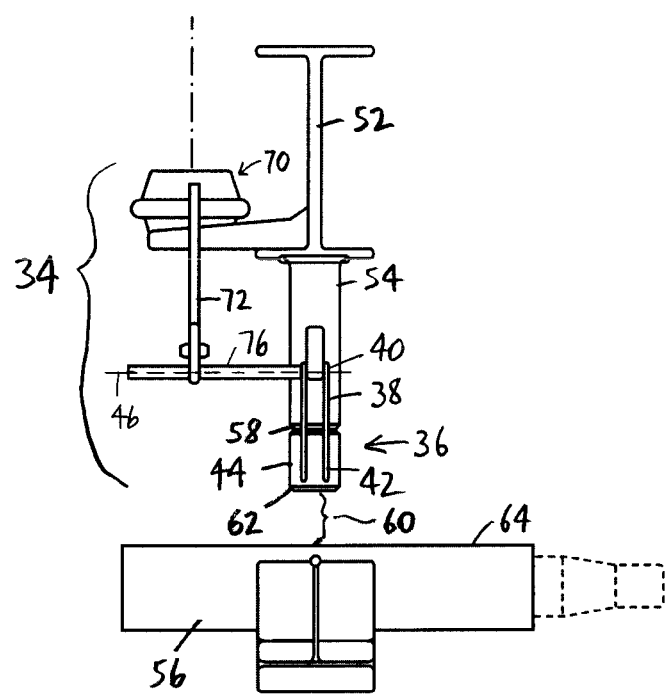
FIG. 6A is a side view of an embodiment of a stop subassembly of the invention, drawn at a larger scale.

In the attached drawings, like reference numerals designate corresponding elements throughout. Reference is first made to FIGS. 1-7 to describe an embodiment of a transformer oil holding assembly of the invention referred to generally by the numeral 20. The transformer oil holding assembly 20 is for holding transformer oil, as will be described, and preferably includes one or more tank subassemblies 22 including one or more tanks 24 for containing the transformer oil. In one embodiment, the tank subassembly 22 preferably includes a lower exterior surface 26 adapted for engagement with a ground surface 28 (FIGS. 3A, 3B). The transformer oil holding assembly 20 preferably also includes one or more sets of wheels for at least partially supporting the tank subassembly 22. The set of wheels 30 is movable between a lowered position (FIG. 3A), in which the tank subassembly 22 is at least partially supported by the set of wheels 30, and a raised position (FIG. 3B), in which the lower exterior surface 26 is at least partially engaged with the ground surface 28 (FIG. 3B). In addition, the transformer oil holding assembly 20 preferably also includes a suspension subassembly 32 mounted to the tank subassembly 22. Preferably, each set of wheels 30 is mounted on the suspension subassembly 32, which is adapted to move each set of wheels 30 between the lowered position and the raised position, and which is also adapted to locate each set of wheels 30 in the lowered and raised positions respectively, as will also be described. The transformer oil holding assembly 20 preferably also includes one or more stop subassemblies 34 for at least partially maintaining the set of wheels 30 in the lowered position. As can be seen in FIG. 6A, the stop subassembly 34 includes a stop lever 36 having an elongate lever body 38 extending between a proximal end 40 and a distal end 42 thereof, and also including a stop element 44 positioned at the distal end 42 of the lever body 38. Preferably, and as can be seen in FIGS. 6B and 6C, the stop lever 36 is pivotable about a pivot axis 46 located at the proximal end 40 of the lever body 38, and the stop lever 36 is pivotable between an engageable condition (FIG. 6B), in which the stop element 44 is engageable with the suspension subassembly 32 to maintain the set of wheels 30 in the lowered position, and a disengaged condition (FIG. 6C), in which the stop element 44 is disengaged from the suspension subassembly 32.

Figure 1:
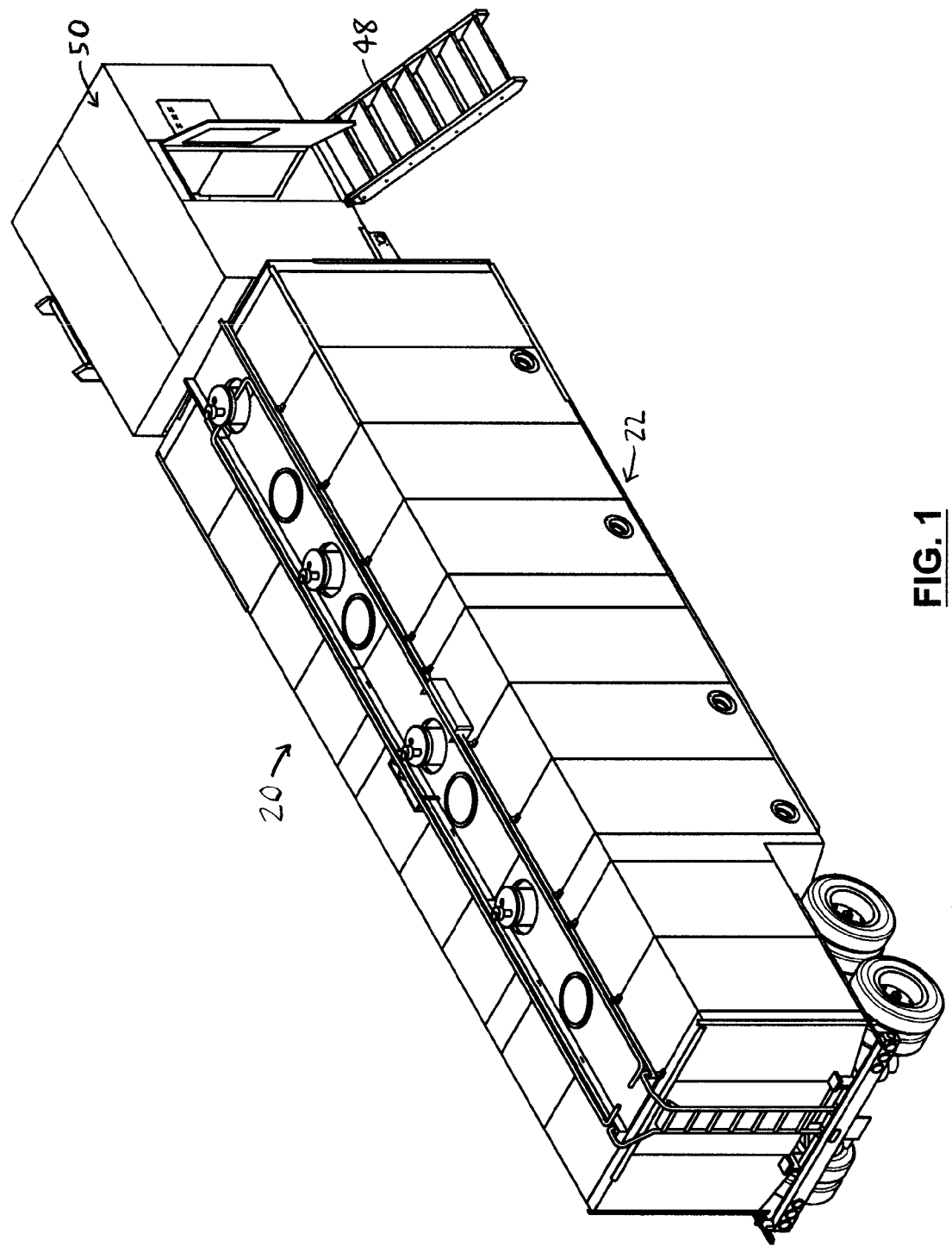
FIG. 1 is an isometric view of an embodiment of the transformer oil holding unit of the invention.
Figure 2:
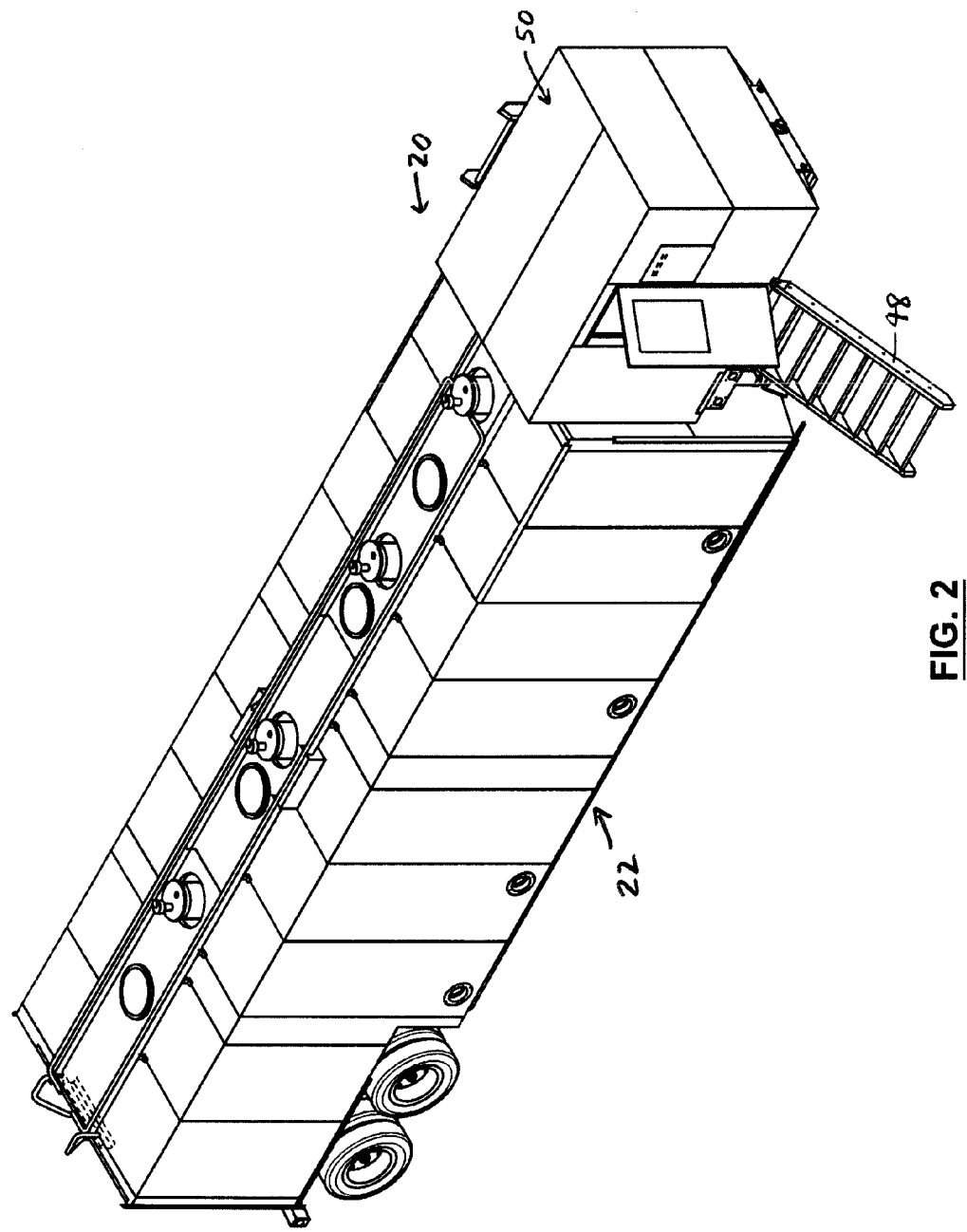
FIG. 2 is another isometric view of the transformer oil holding unit of FIG. 1.
Figure 3A:
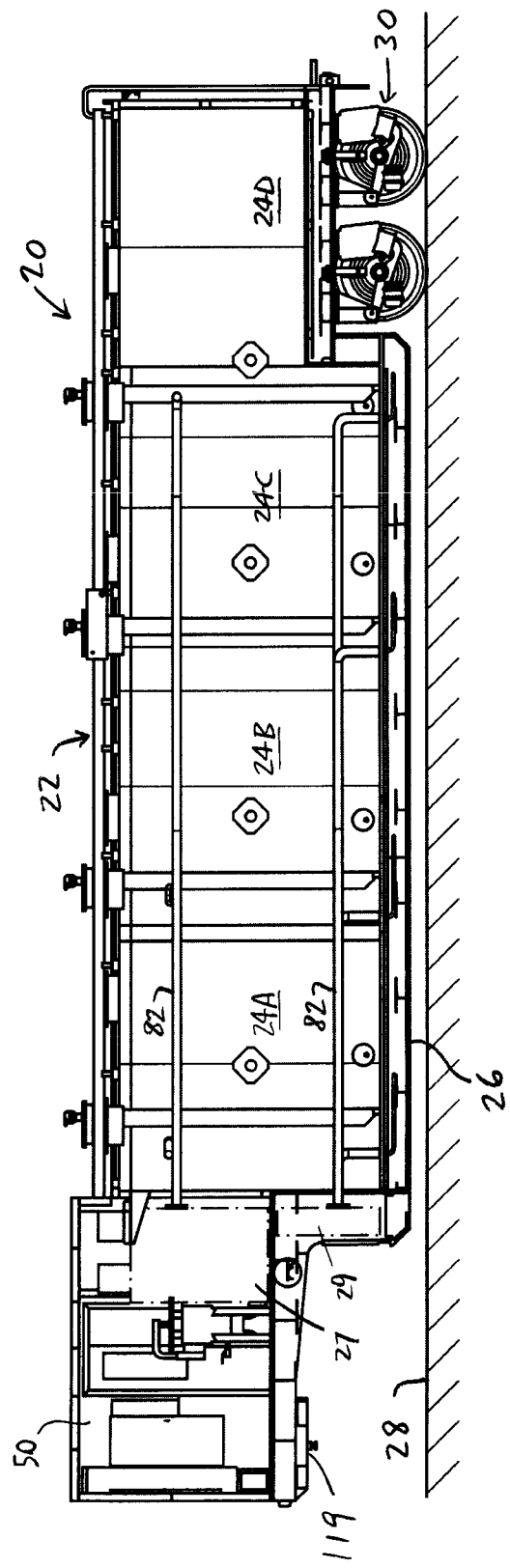
FIG. 3A is a longitudinal cross-section of the transformer oil holding unit of FIGS. 1 and 2.
Figure 3B:
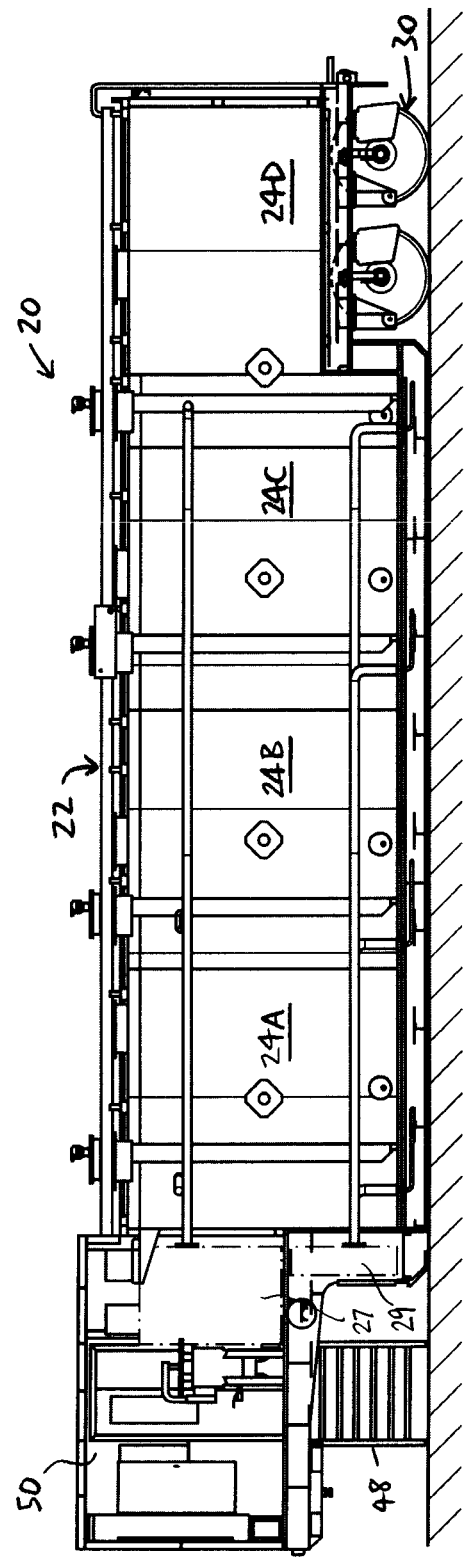
FIG. 3B is another longitudinal cross-section of the transformer oil holding unit of FIGS. 1 and 2.

In FIGS. 1 and 2, the transformer oil holding assembly 20 is shown, for illustrative purposes, in a parked condition, i.e., steps 48 are positioned to allow an operator (not shown) to have access to a control room 50 in which pumps, heaters, valves, and a number of other control means are located, for use by the operator. The control room 50 is included in the tank subassembly 22. It will be appreciated by those skilled in the art that the assembly 20 preferably is sized for travel on public highways (i.e., it is roadworthy), when the wheels 30 are in the lowered position and certain other components of the assembly 20 (e.g., the steps 48) are retracted or folded into a storage position, as the case may be. In one embodiment, the tank subassembly 22 preferably includes a frame portion 52, and the suspension subassembly 32 preferably includes one or more vertical members 54 mounted to the frame 52 and one or more axles 56 (FIG. 5A). The axle 56 is shown in FIG. 6A in a normal position relative to the vertical member 54, i.e., the position in which the axle 56 is located when not subjected to dynamic effects (i.e., jounce or rebound).

As can be seen in FIG. 6A, when the axle 56 is positioned normally relative to the vertical member 54 (i.e., when the wheels 30 are in the lowered position), a lower end 58 of the vertical member 54 is spaced apart from the axle 56 by a distance "$D_1$". When the stop lever 36 is in the engageable condition (FIG. 6A), the stop element 44 is positioned below and proximal to the lower end 58 of the vertical member 54, and a gap 60 is defined between a bottom surface 62 of the stop element 44 and an upper surface 64 of the axle 56. As will be appreciated by those skilled in the art, it is preferred that the gap 60 be sufficiently large to permit movement of the axle 56 relative to the frame portion 52 (i.e., jounce or rebound) while the assembly 20 is moving. The gap 60 is intended to allow such movement, within limits, as will also be appreciated by those skilled in the art.

Figure 6B:
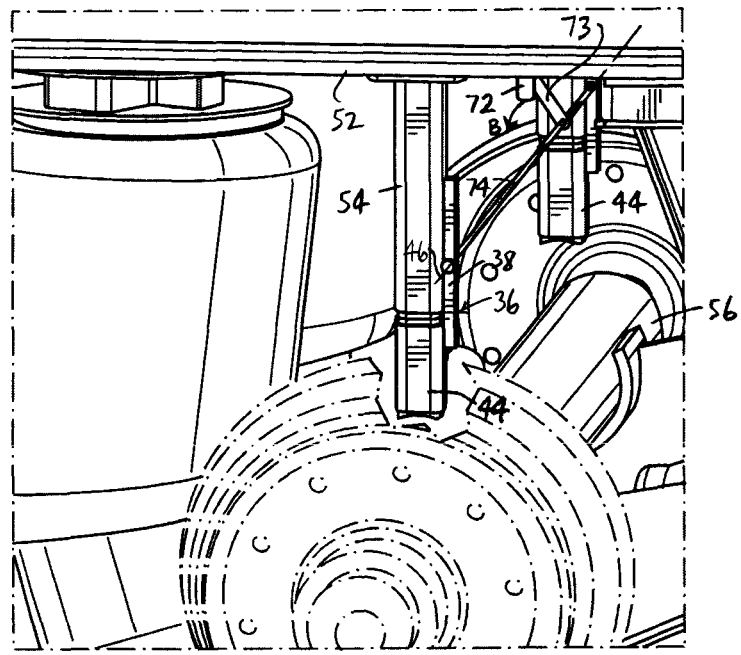
FIG. 6B is an isometric view of the stop assembly of FIG. 6A in which lever bodies thereof are in an engageable condition, drawn at a larger scale.
Figure 6C:
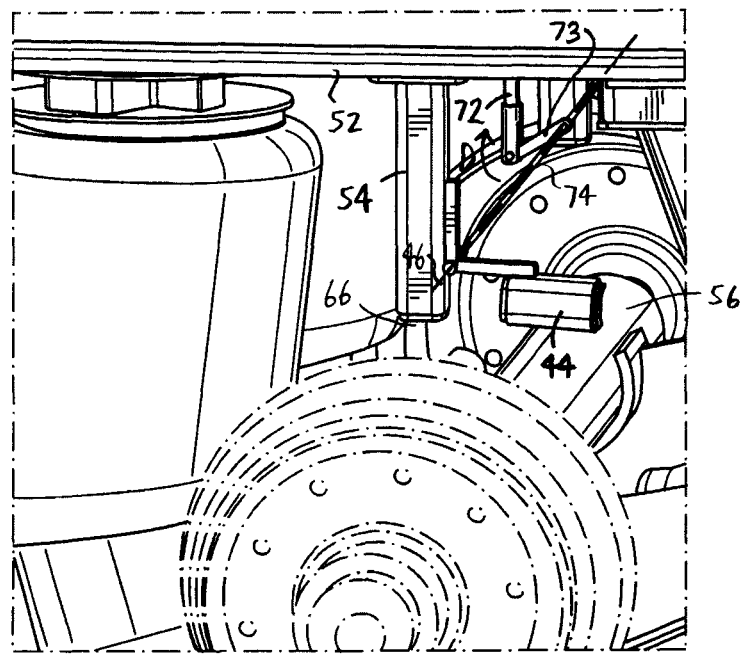
FIG. 6C is an isometric view of the stop subassembly of FIG. 6A in which the lever bodies thereof are in a disengaged condition.

Preferably, and as can be seen in FIGS. 6A and 6B, the stop element 44 is engageable with the suspension subassembly 32 upon the stop element 44 being positioned in an opening 66 defined therein. As described above, the opening 66 preferably is between the vertical member 54 and the axle 56. The pivot axis 46 is located above the opening 66, so that the stop lever 36 is pivotable at least partially under the influence of gravity when moving from the disengaged condition to the engageable condition. Preferably, the stop subassembly 34 also includes a retention means 68 for urging the stop lever 36 into the engageable condition.

Although the foregoing description refers to only one stop lever 36, it will be understood that, as shown in FIGS. 6B and 6C, the stop subassembly 34 preferably includes at least two stop levers 36, i.e., one for each end of the axle 56.

Figure 6D:
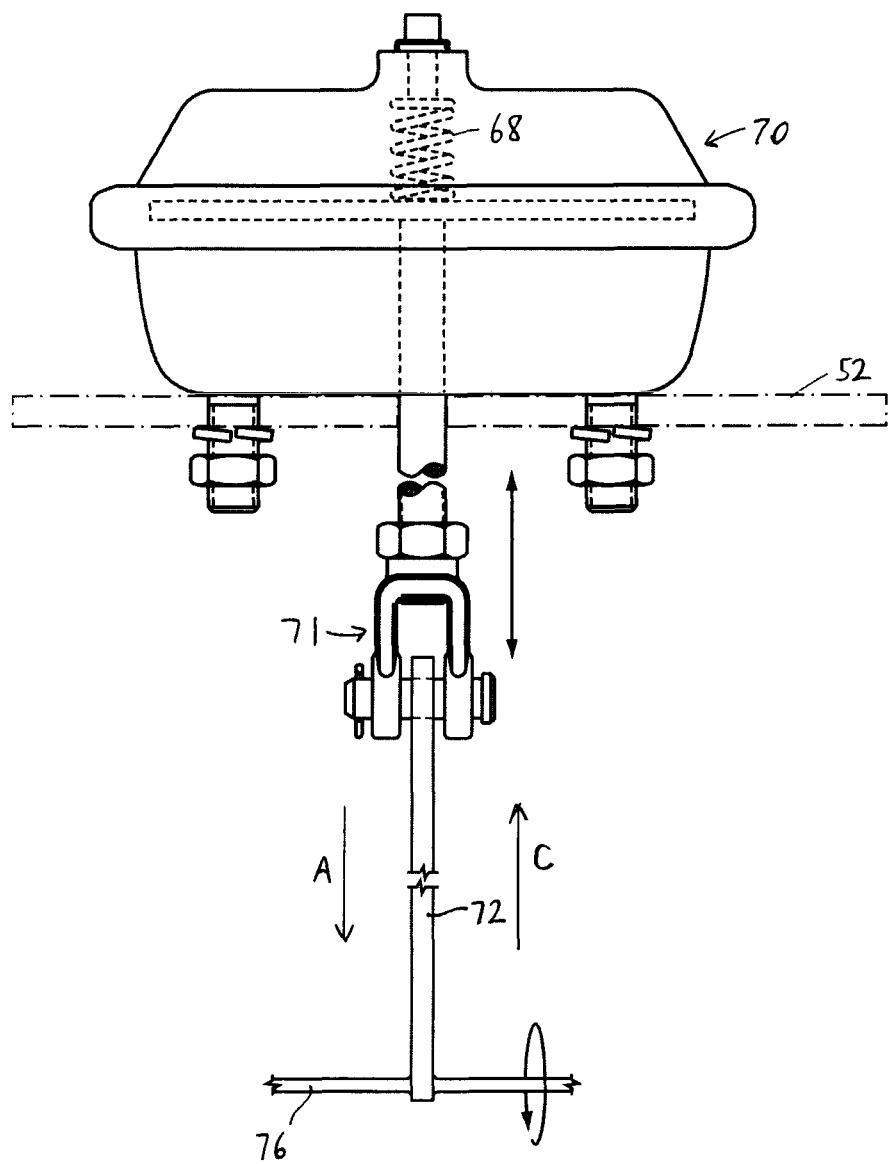
FIG. 6D is a side view of a portion of the stop subassembly of FIG. 6A, drawn at a larger scale.

As can be seen in FIGS. 6A and 6D, the stop subassembly 34 preferably includes an actuator 70 connected by a connecting linkage means 71 to a push rod 72 pivotably connected to a transverse element 73 (FIGS. 6B, 6C). The transverse element 73 preferably is secured to a connecting rod 74 which substantially defines the pivot axis 46.

The actuator 70 preferably is an air cylinder activated by compressed air injected therein, in conventional manner. When compressed air (not shown) is released into the actuator 70, the actuator 70 exerts a downwardly directed force on the push rod 72 (i.e., in the direction indicated by arrow "A" in FIG. 6D). The downwardly moving push rod 72 in turn causes the transverse element 74 to pivot downwardly (i.e., in the direction indicated by arrow "B" in FIG. 6B), causing the stop levers 36 to pivot in a counter-clockwise direction (as presented in FIGS. 6B and 6C), away from the opening 66, and to the disengaged condition.

When the compressed air is released from the actuator, the push rod 72 is allowed to move upwardly (i.e., in the direction indicated by arrow "C" in FIG. 6D), and the transverse element 74 pivots in the direction indicated by arrow "D" in FIG. 6C, i.e., in a clockwise direction, as presented in FIG. 6C. The retention means 68 preferably is a spring which exerts a force generally upwardly (i.e., in the direction indicated by arrow "C" in FIG. 6D), for urging the stop levers 36 to the engageable condition. The retention means 68 also maintains the stop levers 36 in the engageable condition. The movement of the stop levers 36 from the disengaged condition to the engageable condition is also, in part, under the influence of gravity.

It will be appreciated by those skilled in the art that the stop subassembly 34 is constructed so that the "default" position (i.e., the position in which the stop lever 36 is moved to if compressed air is not provided to the actuator 70) is the engageable condition. While the assembly 20 is being moved, the stop lever 36 is urged to and maintained in the engageable condition by the retention means 68. This is a safety measure, as the position of the stop lever 36 in the engageable condition while the wheels 30 are in the lowered position is not dependent on a continued supply of compressed air to the actuator 70. Preferably, the spring 68 is sufficiently strong to hold the stop levers 36 in the engageable condition during normal use, i.e., while the assembly 20 is being moved down a highway. However, because the force exerted by the spring 68 is required to be overcome by the compressed air introduced into the actuator 70 when it is desired to move the stop levers 36 to the disengaged condition, it is desirable that the strength of the spring 68 be the minimum required for holding the stop levers 36 in the engageable condition.

As can be seen in FIGS. 3A and 3B, the tank subassembly 22 preferably includes a number of tanks 24. For illustrative purposes, the tanks in FIG. 3A are identified as 24A-24D respectively. The transformer holding assembly 20 also preferably includes a piping subassembly 80 through which the transformer oil is movable into and out of the tanks 24. In particular, the piping subassembly 80 includes a number of pipes 82 and one or more pumps 84, for pumping the transformer oil through the pipes 84 into and out of the tanks 24. Preferably, the piping subassembly 80 also includes one or more heaters 86 for heating the transformer oil to one or more preselected temperatures as the transformer oil passes through the heater 86. It will be understood that the walls 31 defining the tanks 24 include suitable thermal insulation (not shown), as is known in the art, to retard heat loss from the transformer oil which is positioned in the tanks 24. Because the use of thermal insulation is well known in the art, it is unnecessary to provide further details regarding thermal insulation. In conventional manner, the tanks and the insulation around them preferably are substantially covered by a relatively thin skin of suitable material, e.g., thin sheet metal.

Figure 4B:
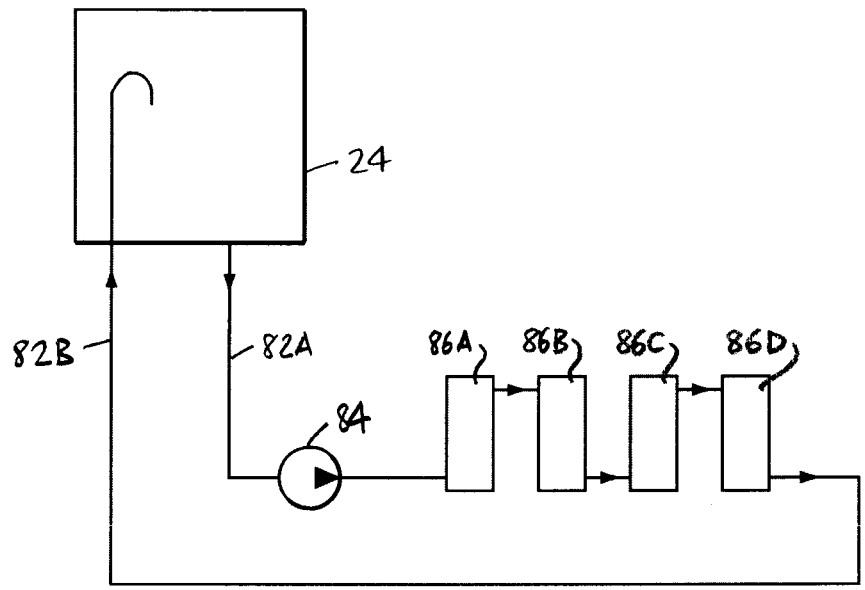
FIG. 4B is a schematic illustration showing a mode of use of the invention.
Figure 4C:
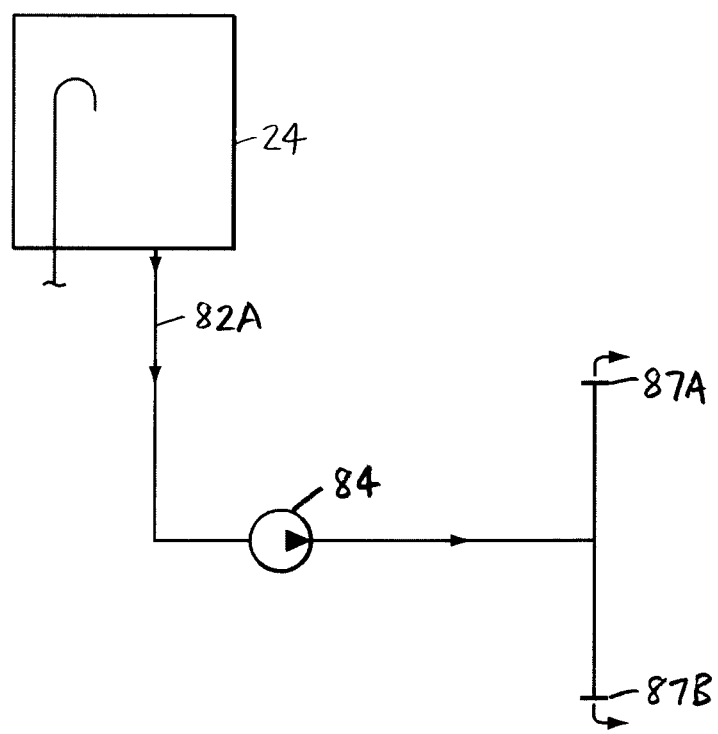
FIG. 4C is a schematic illustration showing another mode of use of the invention.
Figure 4D:
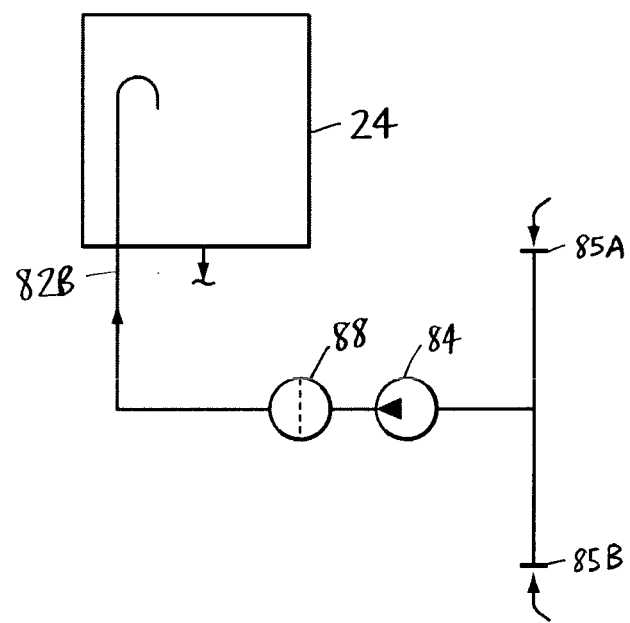
FIG. 4D is a schematic illustration showing another mode of use of the invention.
Figure 4E:
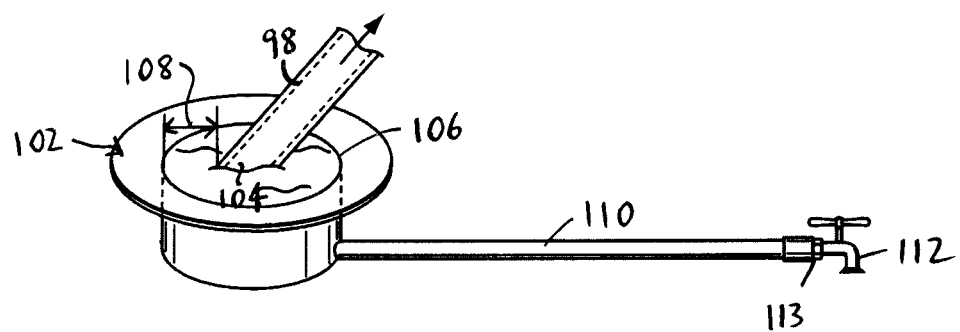
FIG. 4E is an isometric view of a portion of the piping subassembly of FIG. 4A, drawn at a larger scale.

For illustrative purposes, in FIGS. 4B-4D, three basic modes of operation of the transformer oil holding assembly 20 are shown. For instance, a recirculatory mode is illustrated in FIG. 4B. In the circumstances schematically illustrated in FIG. 4B, transformer oil is initially positioned in the tank 24. The transformer oil is circulated through heaters identified for convenience as 86A-86D in FIG. 4B in order to maintain the temperature of the transformer oil in the tank at the predetermined threshold temperature, i.e., between about 100° C. and 110° C. The heaters 86A-86D preferably are connected in series. As schematically illustrated in FIG. 4B, the transformer oil preferably is pumped by the pump 84 from the tank 24 through the outlet pipe 82A through the heaters 86A-86D and subsequently through the inlet pipe 82B, back to the tank. Accordingly, the transformer oil is circulatable through the heaters for maintaining the transformer oil above the predetermined threshold temperature while the transformer oil is in the transformer oil holding assembly.

Any suitable heaters may be used. Preferably, the heaters 86 are electrical circulation heaters with high temperature control protection Those skilled in the art will appreciate that, in order to maintain a relatively large volume of transformer oil at the predetermined threshold temperature or greater, the transformer oil may be circulated through the heaters 86 many times, e.g., over several hours.

Another mode of operation (i.e., an input mode) is disclosed in FIG. 4C. Transformer oil in the tank 24 is pumped out of the tank 24 via outlet pipe 82A to outlets 87A, 87B at which pipes or hoses (not shown) leading to another receptacle (e.g., a transformer, or another container) are connectable, to permit transfer of the transformer oil thereto.

FIG. 4D shows another mode of operation (i.e., an output mode). In this situation, transformer oil is transferred into the tank 24, e.g., from a transformer (not shown), or from another container. The connection(s) with pipes or hoses (not shown) are made at inlets 85A, 85B. As shown in FIG. 4D, the pump 84 pumps the transformer oil through a filtration means 88 and the inlet pipe 82B, and ultimately into the tank 24.

As will be appreciated by those skilled in the art, the incoming transformer oil preferably is filtered to remove any impurities in solid form, which can be removed via filtering. The filtration means 88 preferably is any suitable filtration means. It is preferred that the filtration means 88 includes a pressure vessel filter. A cartridge-type Code-designed pressure vessel filter has been found to be suitable.

It will be understood that many details of the piping subassembly 80 have been omitted from the drawings (e.g., as indicated by the blank spaces 27, 29 in FIGS. 3A and 3B) in order to simplify the drawings. For instance, although the piping subassembly 80 preferably includes a number of valves (automatic and otherwise) for controlling the flow of the transformer oil, the valves are generally omitted, to simplify the drawings, as those skilled in the art would be familiar with the sizes and locations of valves in arrangements such as the piping subassembly 80, and further description thereof is therefore unnecessary.

Figure 7:
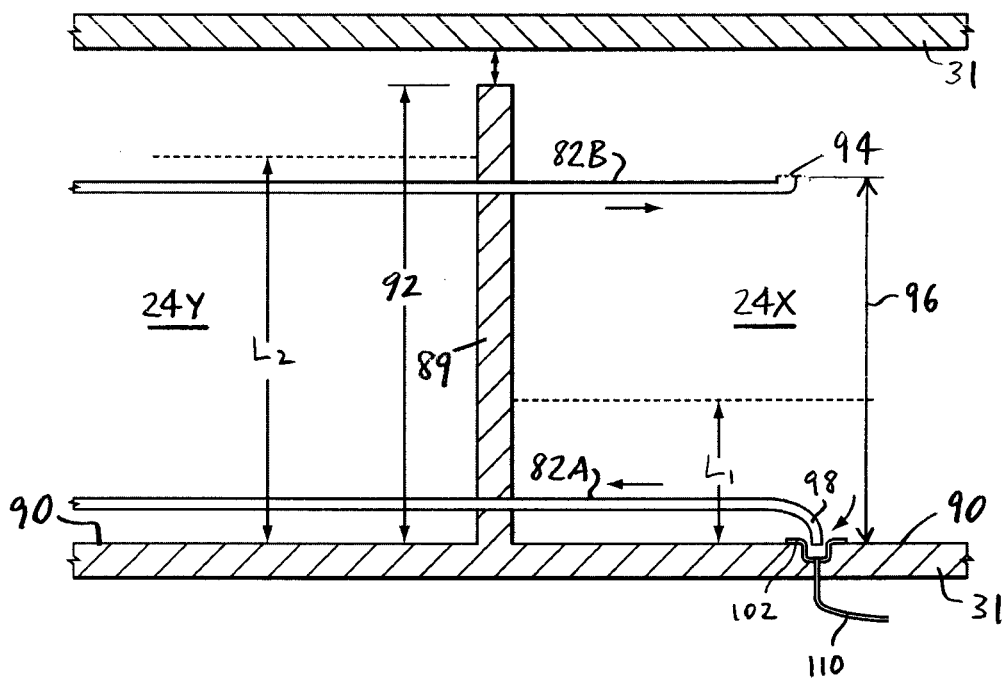
FIG. 7 is a cross-section of a portion of the unit of FIG. 1, drawn at a smaller scale.

In one embodiment, each tank 24 is at least partially defined by a wall 89 between each tank 24 and an adjacent one of the tanks. For illustrative purposes, the tank and the adjacent tank are identified in FIG. 7 as 24Y and 24X respectively. By way of example, the level of the transformer oil in tank 24X is designated "$L_1$", and the level of transformer oil in tank 24Y is designated as "$L_2$". In FIG. 7, only the inlet pipe 82B and the outlet pipe 82A for the tank 24X are shown. (It will be understood that the inlet and outlet pipes for the tank 24Y are not included in FIG. 7 to simplify the drawing.) Each tank is at least partially defined by a floor portion 90 thereof. As shown in FIG. 7, the wall 89 preferably extends to a predetermined height 92 above the floor portion 90 selected to permit fluid communication between each tank 24X, 24Y over the wall 89. In this way, the wall 89 permits overflow from one tank to the next. This is a safety feature, intended to allow the operator a relatively large margin of error when transformer oil is pumped into the assembly 20 from another container, e.g., a transformer, or from another source. This safety feature is intended to allow the operator time in which to address a situation where a tank is overfilled, e.g., if sensors (described below) have failed.

In one embodiment, the transformer oil holding assembly 20 preferably also includes a number of nozzles 94. Each nozzle 94 is positioned in each tank 24 respectively, for directing the transformer oil into the tank 24 at a predetermined distance 96 above the floor portion 90 of each tank 24. Preferably, each nozzle 94 is formed to cause the transformer oil exiting therefrom to be directed upwardly in a plurality of streams, to minimize turbulence in the transformer oil in the tank when transformer oil is directed through the nozzle 94.

As can be seen in FIGS. 4A, 4D, and 7, the outlet pipe 82A preferably includes an end portion 98 bent downwardly relative to the floor portion 90 of the tank from which the outlet pipe 82A is to draw the transformer oil. Preferably, the piping subassembly 80 includes a sump receptacle 102 in which a terminal part 104 of the end portion 98 is positionable. As can be seen in FIGS. 4D and 7, the terminal part 104 preferably is spaced apart from a rim 106 of the sump receptacle 102 by a predetermined distance 108. Because of the predetermined distance 108, when transformer oil is to be removed from the tank, the transformer oil in the tank is drawn into the terminal part 104 when the pump 84 is activated.

As can also be seen in FIGS. 4A and 4D, the sump receptacle 102 preferably is drainable via a relatively small diameter drainage pipe 110, which has a spigot 112 at its distal end 113. The sump receptacle 102 preferably is drained when the tank associated therewith is emptied. Typically, a small volume of transformer oil remains in the sump receptacle 102 and in the drainage pipe 110 after the tank 24 is otherwise drained. When the spigot 112 is opened, a small quantity of transformer oil exits, which preferably is captured for re-use. Also, as will be appreciated by those skilled in the art, in a case where the transformer oil has contaminated, the tank is required to be cleaned. After the tank has been appropriately cleaned, the sump receptacle 102 preferably is promptly drained via the drainage pipe, by opening the spigot 112.

In use, the assembly 20 is moved to the work site. It is preferably towed by a tractor unit (not shown), i.e., with the wheels lowered (road ready) and the stop assembly and the lever bodies of the stop assembly in the engageable condition. Once at the site, the assembly 20 preferably is located in an appropriate position relative to the transformer or the other container from which the transformer oil is to be taken. Once the assembly 20 is properly located, the lever bodies are moved to the disengaged condition, and the wheels 30 are raised (i.e., air is released from the air suspension), causing the tank subassembly to lower until the lower exterior surface thereof is engaged with the ground surface, as shown in FIG. 3A. The transformer oil is then loaded into the tanks. It can be seen, therefore, that the suspension subassembly and the wheels are not required to support the transformer oil load. The suspension subassembly and the wheels are only required to at least partially support the load of the assembly, i.e., the tank subassembly, empty of transformer oil.

The flow of transformer oil to and from each tank is monitored and closely controlled, in order to provide substantially uniformed heating of the oil. Control is effected via a control system 105 which includes a PLC (programmable logic controller) 114 (FIG. 5B), in accordance with pre-programmed parameters. It will be understood that the flow of oil in and out of the tanks preferably is controlled by automatic valves 115 and by the pump(s) 84, which are controlled via the PLC 114.

It is preferred that each tank is filled until at least the nozzle positioned in each tank is submerged in the transformer oil. Once the transformer oil has been loaded into the assembly, the PLC 114 may activate the piping subassembly (i.e., including the heaters) to heat the oil via recirculation of the oil through the heaters, as described above.

Preferably, overflow sensors 116 are mounted in each tank to provide the PLC 114 with real time tank level readings. Various types of overflow sensors could be used. Such sensors may be, for example, radar-based, or they may include transducers. As described above, in the event that the overflow sensors 116 fail, the tanks are in communication with each other over the mutual tank walls, as described above. In addition, the assembly 20 preferably also includes upper limit level sensors 117 which provide an additional safety measure. If the transformer oil level in the tanks becomes sufficiently high, the upper limit level sensors 117 are activated. Upon activation thereof, the assembly 20 is automatically shut down, and in particular, no further transformer oil is pumped into the tanks. Various types of upper limit level sensors 117 could be used. For example, in one embodiment, the upper limit level sensors 117 preferably are infrared light transmitters and receivers.

The assembly 20 preferably is also provided with low-level sensors 107. The high-level and low-level sensors are electronically integrated in the control system 105 (FIG. 5B to monitor the levels of transformer oil in the tanks (i.e., the volume of transformer oil in the tanks respectively), and in particular to shut down the pumps 84 as required when a tank is full or empty, as the case may be. The volume of transformer oil in each tank respectively preferably is indicated on a display 111 located in the control room.

One or more of the heaters may be activated, depending on the volume of oil to be heated and the extent to which the oil is required to be heated. The activation and de-activation of the heaters is also controlled by the PLC 114. Information about the temperature of the transformer oil in each tank is provided by temperature sensors 118 to the PLC 114, and based on such temperature data, the PLC 114 may require that transformer oil be heated via recirculation.

As indicated above, a tractor unit (not shown) is connected to the transformer oil holding assembly 20 when the wheels are lowered and the assembly is otherwise made roadworthy, and pulls the assembly 20 to the work site. Referring to FIG. 3A, it will be understood that the tractor unit is connected to the assembly 20 at a conventional connecting means 119. As is also noted above, the assembly 20 preferably is proportioned and sized so that, when the wheels are lowered and certain elements (such as the steps 48) are stored, the assembly is roadworthy, i.e., it is in compliance with the regulations governing vehicle size (height, length, and width) for travel on major public highways. However, because of this, there are significant constraints on the "footprint" of the assembly, when it is in roadworthy condition.

Figure 8A:
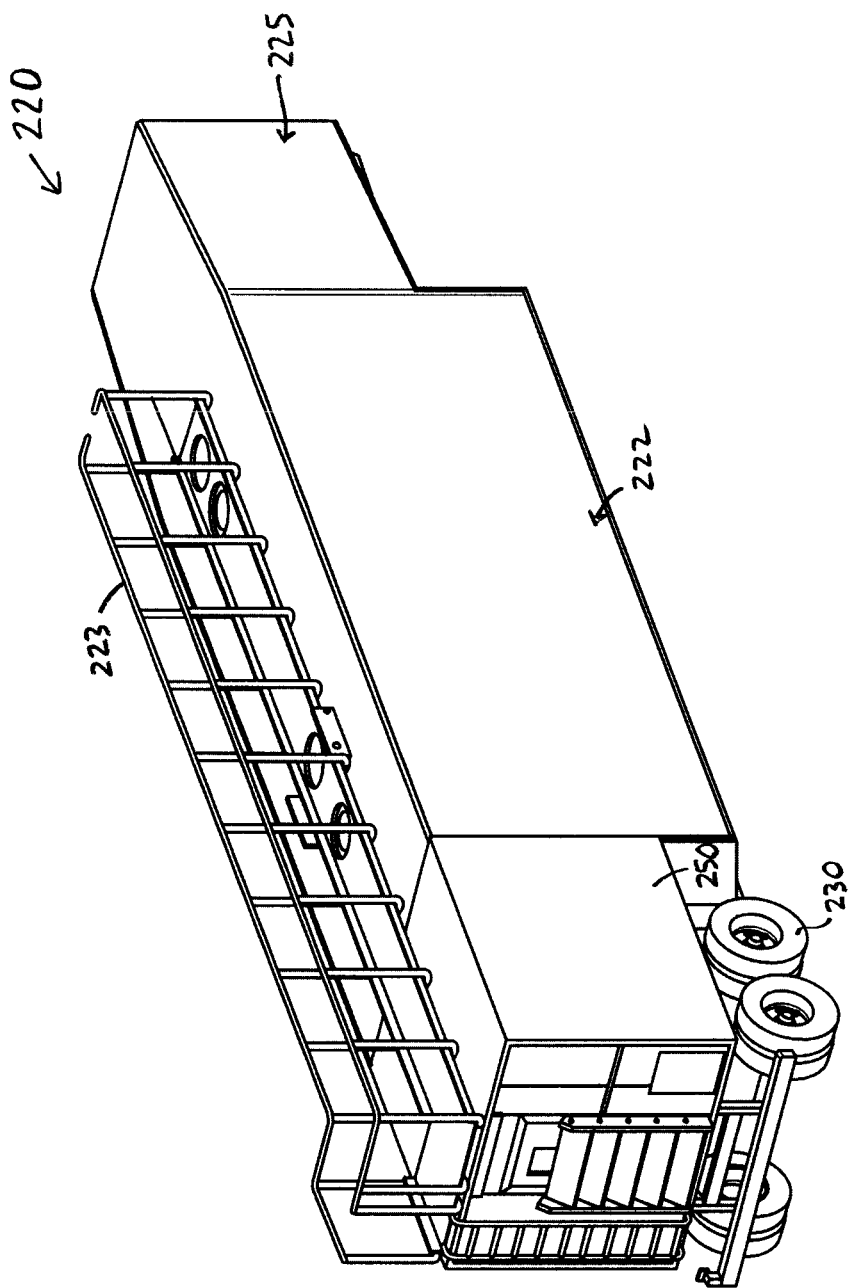
FIG. 8A is an isometric view of an alternative embodiment of the transformer oil holding assembly of the invention, drawn at a smaller scale.
Figures 8B, 8C:
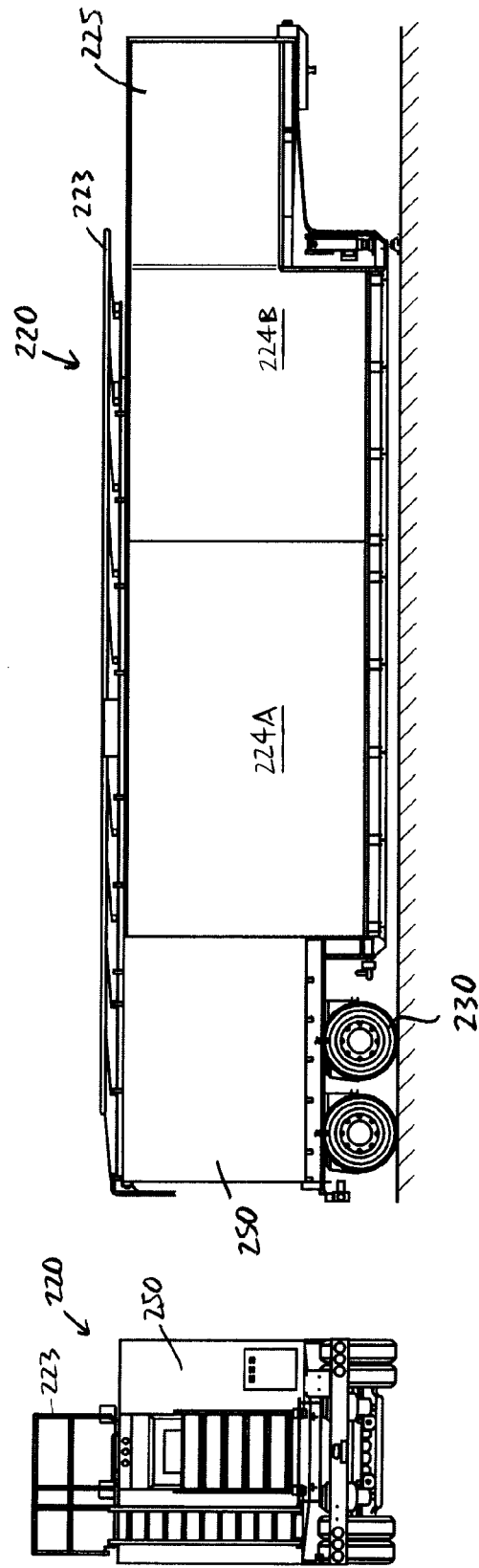
FIG. 8B is an end view of the transformer oil holding assembly of FIG. 8A, drawn at a smaller scale.
FIG. 8C is a longitudinal cross-section of the transformer oil holding assembly of FIGS. 8A and 8B.

An alternative embodiment of the transformer oil assembly 220 of the invention is shown in FIGS. 8A-8C. In this embodiment, a control room 250 is located at a back end 221 of the assembly 220. As can be seen in FIG. 8C, in one embodiment, the tank subassembly 222 preferably includes two tanks, designated 224A and 224B in FIG. 8C for illustrative purposes, as well as the control room 250. The piping is simplified somewhat if two tanks are provided instead of, for example, four. It has been determined that the arrangement of the control room 250 and the tanks 224A, 224B shown in FIGS. 8A-8C provides for a substantially larger control room 250 and better utilization of internal space to provide the tanks 224A, 224B.

It will be understood that the wheels 230 of the assembly 220 are movable between raised and lowered positions, as described above. It will also be understood that the assembly 220 also includes the other parts of the assembly 20, for example, one or more stop subassemblies and a piping subassembly as described above in connection with the assembly 20. As shown in FIGS. 8A and 8B, the assembly 220 includes a retractable railing 223, adapted for erection when the wheels are in the raised position and the assembly 220 is ready to receive transformer oil. The railing 223 is also adapted to be retracted (and secured in a stored position) as shown in FIG. 8C when the wheels are in the lowered position, and the assembly 220 is to be moved.

As can be seen in FIG. 8A, a front part 225 of the tank subassembly 222 is tapered. This tapering has been found to be advantageous, as the tapering provides better rearward scope of vision to a driver (not shown) of the tractor unit attached to the assembly 220 at the front part 225, while towing or placing the assembly 220. This is a relatively important safety feature, because of the relatively large size of the assembly 220.

It will be appreciated by those skilled in the art that the invention can take many forms, and that such forms are within the scope of the invention as described above. The foregoing descriptions are exemplary and their scope should not be limited to the preferred versions contained herein.

We claim:

1. A transformer oil holding assembly for holding transformer oil, the transformer oil holding assembly comprising:
   at least one tank subassembly comprising at least one tank for containing the transformer oil, said at least one tank subassembly comprising a lower exterior surface adapted for engagement with a ground surface;
   at least one set of wheels for at least partially supporting said at least one tank subassembly, said at least one set of wheels being movable between a lowered position, in which said at least one tank subassembly is at least partially supported by said at least one set of wheels, and a raised position, in which the lower exterior surface of said at least one tank subassembly is at least partially engaged with the ground surface;
   a suspension subassembly mounted to said at least one tank subassembly;
   said at least one set of wheels being mounted on the suspension subassembly, the suspension subassembly being adapted to move said at least one set of wheels between the lowered position and the raised position, and to locate said at least one set of wheels in the lowered and the raised positions respectively;
   at least one stop subassembly for at least partially maintaining said at least one set of wheels in the lowered position;
   said at least one stop subassembly comprising a stop lever comprising an elongate lever body extending between a proximal end and a distal end, and a stop element positioned at the distal end of the lever body;
   the stop lever being pivotable about a pivot axis located at the proximal end of the lever body; and
   the stop lever being movable between an engageable condition, in which the stop element is engageable with the suspension subassembly for maintaining said at least one set of wheels in the lowered position, and a disengaged condition, in which the stop element is disengaged from the suspension subassembly.

2. A transformer oil holding assembly according to claim 1 in which:
   the stop element is engageable with the suspension subassembly upon the stop element being positioned in an opening defined therein; and
   the pivot axis is located above the opening, such that the stop lever is pivotable at least partially under the influence of gravity when moving from the disengaged condition to the engageable condition.

3. A transformer oil holding assembly according to claim 1 in which said at least one stop subassembly additionally comprises a retention means for urging the stop lever to the engageable condition.

4. A transformer oil holding assembly according to claim 1 in which said at least one tank subassembly comprises a plurality of tanks for containing the transformer oil.

5. A transformer oil holding assembly according to claim 4 additionally comprising a piping subassembly through which the transformer oil is movable into and out of the tanks.

6. A transformer oil holding assembly according to claim 5 in which the piping subassembly comprises a plurality of pipes and at least one pump for pumping the transformer oil through the pipes into and out of the tanks.

7. A transformer oil holding assembly according to claim 4 in which each said tank is at least partially defined by a wall between each said tank and an adjacent one of said tanks, each said tank being at least partially defined by a floor portion thereof, each said wall extending to a predetermined height above the floor portion selected to permit fluid communication between each said tank and said adjacent one of said tanks over the wall.

8. A transformer oil holding assembly according to claim 5 in which the piping subassembly comprises at least one heater for heating the transformer oil to at least one preselected temperature as the transformer oil passes through said at least one heater.

9. A transformer oil holding assembly according to claim 8 in which the piping subassembly is adapted for heating the transformer oil as the transformer oil is pumped toward a selected one of the tanks.

10. A transformer oil holding assembly according to claim 9 in which the transformer oil is circulatable through said at least one heater for maintaining the transformer oil above a predetermined threshold temperature while the transformer oil is in the transformer oil holding assembly.

11. A transformer oil holding assembly according to claim 7 additionally comprising a plurality of nozzles, at least one of said nozzles being positioned in each said tank respectively, for directing the transformer oil into said tank at a predetermined distance above the floor portion of each said tank.

12. A transformer oil holding assembly for holding transformer oil, the transformer oil holding assembly comprising:
   at least one tank subassembly comprising a plurality of tanks for containing the transformer oil;
   a piping subassembly through which the transformer oil is movable into and out of the tanks;
   the piping subassembly comprising at least one heater for heating the transformer oil to at least one preselected temperature as the transformer oil passes through said at least one heater; and each said tank being at least partially defined by a wall between each said tank and an adjacent one of said tanks, each said tank being at least partially defined by a floor portion thereof, each said wall extending to a predetermined height above the floor portion selected to permit fluid communication between each said tank and said adjacent one of said tanks over the wall.

13. A transformer oil holding assembly for holding transformer oil, the transformer oil holding assembly comprising:
at least one tank subassembly comprising a plurality of tanks for containing the transformer oil;
a piping subassembly through which the transformer oil is movable into and out of the tanks;
the piping subassembly comprising at least one heater for heating the transformer oil to at least one preselected temperature as the transformer oil passes through said at least one heater;
at least one set of wheels for at least partially supporting said at least one tank subassembly, said at least one set of wheels being movable between a lowered position, in which said at least one tank subassembly is at least partially supported by said at least one set of wheels, and a raised position, in which a lower exterior surface of said at least one tank subassembly is at least partially engaged with the ground surface;
a suspension subassembly mounted to said at least one tank subassembly;
said at least one set of wheels being mounted on the suspension subassembly, the suspension subassembly being adapted to move said at least one set of wheels between the lowered position and the raised position, and to locate said at least one set of wheels in the lowered and the raised positions respectively;
at least one stop subassembly for at least partially maintaining said at least one set of wheels in the lowered position;
said at least one stop subassembly comprising a stop lever comprising an elongate lever body extending between a proximal end and a distal end, and a stop element positioned at the distal end of the lever body;
the stop lever being pivotably mounted about a pivot axis located at the proximal end of the lever body; and
the stop lever being movable between an engageable condition, in which the stop element is engageable with the suspension subassembly to maintain said at least one set of wheels in the lowered position, and a disengaged condition, in which the stop element is disengaged from the suspension subassembly.

14. A transformer oil holding assembly according to claim 13 in which:
the stop element is engageable with the suspension subassembly upon the stop element being positioned in an opening defined therein; and
the pin is positioned above the opening, such that the stop lever is pivotable at least partially under the influence of gravity when moving from the disengaged condition to the engageable condition.

15. A transformer oil holding assembly according to claim 13 in which said at least one stop subassembly additionally comprises a retention means for urging the stop lever to the engageable condition.

* * * * *